United States Patent
Frey et al.

(10) Patent No.: US 6,879,072 B2
(45) Date of Patent: Apr. 12, 2005

(54) ACTUATING DEVICE, PARTICULARLY FOR ACTUATING LOCKING DIFFERENTIALS ON VEHICLES

(75) Inventors: Ronald Frey, Bönnigheim (DE); Harald Schmidt, Zaberfeld (DE); Johannes Helmich, Wertheim (DE); Birgit Scheytt, Vaiuivgen (DE); Werner Baeskow, Hessigheim (DE)

(73) Assignee: Valeo Motoren und Aktuatoren GmbH (DE)

( * ) Notice: Subject to any disclaimer, the term of this patent is extended or adjusted under 35 U.S.C. 154(b) by 0 days.

(21) Appl. No.: 10/318,990

(22) Filed: Dec. 12, 2002

(65) Prior Publication Data

US 2003/0218392 A1 Nov. 27, 2003

(30) Foreign Application Priority Data

Dec. 12, 2001 (DE) ........................................ 101 60 846

(51) Int. Cl.[7] ................................................ H02K 7/02
(52) U.S. Cl. .......................................... 310/77; 310/76
(58) Field of Search .............................. 310/76, 77, 78, 310/233, 68 B

(56) References Cited

U.S. PATENT DOCUMENTS

| | | | | |
|---|---|---|---|---|
| 2,514,693 A | * | 7/1950 | Chapman ...................... | 310/77 |
| 2,520,204 A | * | 8/1950 | Hancock ...................... | 188/171 |
| 4,783,627 A | * | 11/1988 | Pagel et al. ............. | 324/207.22 |
| 5,050,711 A | * | 9/1991 | Sawato ........................ | 188/164 |
| 5,982,063 A | * | 11/1999 | Lutz et al. ..................... | 310/77 |
| 6,550,599 B2 | * | 4/2003 | Kudou et al. ............. | 192/223.2 |

FOREIGN PATENT DOCUMENTS

| | | |
|---|---|---|
| DE | 1 261 587 | 6/1964 |
| DE | 2 203 516 | 1/1972 |
| DE | 195 26 820 | 1/1997 |
| DE | 198 11 424 | 8/1999 |
| DE | 199 45 657 | 9/1999 |
| JP | 63190532 | 8/1988 |

* cited by examiner

Primary Examiner—Darren Schuberg
Assistant Examiner—Nguyen Hanh
(74) Attorney, Agent, or Firm—Young & Basile, P.C.

(57) ABSTRACT

An actuating device, specifically for actuating locking differentials on vehicles, having an actuating shaft, a drive unit to drive the actuating shaft, where the drive unit comprises an armature core mounted to the actuating shaft so as not to rotate, and a commutator mounted to the actuating shaft so as not to rotate and/or with an electromagnetic brake unit to slow and/or stop the actuating shaft, where the brake unit includes a brake hub flange mounted on the armature so as not to rotate and having a single- or multi-piece housing tightly enclosing the drive unit and the brake unit, where the free end of the actuating shaft extends from the housing and with a sensor to measure the angle of rotation of the shaft, where the sensor unit includes at least one trigger wheel indirectly coupled to the shaft and at least one sensor scanning the trigger wheel position and coupled indirectly to the housing.

21 Claims, 6 Drawing Sheets

ACTUATING DEVICE, PARTICULARLY FOR ACTUATING LOCKING DIFFERENTIALS ON VEHICLES

BACKGROUND

The invention relates to an actuating device, particularly for actuating locking differentials on vehicles.

Actuating devices of this type find an application particularly in a vehicle to assist the drive and brake systems. Such devices normally comprise a drive unit to drive an actuating shaft and a brake unit to slow the actuating shaft. A locking differential can be engaged or disengaged by means of the actuating shaft. The drive unit performs the actual shifting action. The brake unit keeps the actuating shaft in a predetermined position.

Severe demands are placed on actuating devices of this type. In particular they must withstand operating temperatures of several hundred degrees Celsius. The actuating shaft can be subject to only relatively minor play so that it can ensure functionally reliable actuation of the locking differentials. In addition, the actuating shaft should be of uncomplicated construction and be simple to install. The actuating shaft should also be of compact dimensions.

The object of the present invention is therefore to propose an actuating device in which specifically extremely precise actuation of the actuating shaft is possible. At the same time, the actuating device should have as few components as possible.

SUMMARY

The provision of a sensor unit to measure the angle of rotation has the advantage that the exact position of the actuating shaft can be determined. To shift the locking differential, for example, precisely, it is necessary to specify or to establish exactly the angle of rotation of the actuating shaft.

In a preferred aspect of the invention, the trigger wheel is located on the brake hub flange. This has the advantage that no separate component has to be provided to locate the trigger wheel on the actuating shaft. This reduces the number of tolerances which go into the resulting air gap between the rotating trigger wheel and the stationary sensor. In addition, there is no need for additional assembly of the trigger wheel to the actuating shaft.

The trigger wheel is advantageously configured as one piece with the brake hub flange. The brake hub flange including the trigger wheel can therefore be handled as a separate component. Component tolerances are furthermore reduced as a result of the one-piece construction.

A further aspect of the invention has the trigger wheel positioned on the side of the brake hub flange facing away from the free end of the actuating shaft, or on the side of the brake hub flange facing toward the commutator. This has the advantage that the trigger wheel is located in an area which is not required for other components.

On the other hand it is conceivable to locate the trigger wheel not on the brake hub flange, but on the commutator. This arrangement also has the advantage that no additional assembly of the trigger wheel to the actuating shaft is required. The number of tolerances is further reduced; the specified dimension for the air gap between trigger wheel and sensor can be maintained with less manufacturing expense.

The trigger wheel is advantageously located on the face of the commutator facing away from the armature core. It is possible to locate the trigger wheel in this area of the commutator without affecting other components.

A particularly preferred aspect of the invention is characterized in that the trigger wheel is integrated into the commutator. This has the advantage that no extra installation space has to be made available for the trigger wheel. The entire actuating device can be made smaller as a result.

It is advantageous if the commutator has an outer contact layer and an inner core forming the trigger wheel. The contact layer is advantageously made of an electrically conductive material, such as copper. It acts as the contact surface for brushes which interact with the commutator.

An intermediate layer is advantageously provided between the contact layer and the core forming the trigger wheel. This intermediate layer can be electrically insulating and consist specifically of molded plastic material. The advantage of an intermediate layer of this kind is that potential interactions between the contact layer and the commutator core constituting the trigger wheel are suppressed.

An advantageous aspect of the commutator is characterized in that the commutator has slots directed radially inward, which subdivide the contact layer into bars or annular segments. Advantageously, the slots are so deep that they subdivide the trigger wheel into trigger wheel segments, where the bases of the slots are at the core which constitutes the trigger wheel. This has the advantage that both the core and the contact layer are configured as annular cylinders for manufacturing the commutator. The slotting of the commutator can take place in a subsequent process step, where the trigger wheel core is subdivided into trigger wheel segments as a result of the slots. A commutator of this kind can be produced very inexpensively as a result.

Advantageously the bars, or annular segments, of the commutator form the trigger wheel. The bars, or annular segments, then have to be of an appropriate material. An aspect of the invention such as this has the advantage that an additional trigger wheel is not needed, which saves components and machining steps. Direct scanning of the bars or annular segments of the commutator takes place advantageously in the area of the weld spots.

Another preferred aspect of the invention is characterized in that a brush rocker with brush holders and brushes to contact the commutator is located on the side of the commutator facing the free end of the actuating shaft, or between the brake hub flange and the commutator. Preferably the brush rocker also has the sensor in addition to the brush holders and the brushes. The trigger wheel can be positioned either on the commutator or integrated into same, or on the brake hub flange.

The sensor can scan the trigger wheel either axially or radially.

The sensor unit can be configured specifically as a Hall generator unit. In one case, the sensor can be magnetically biased and the trigger wheel can be of a ferrous material. In the other case, the sensor can be magnetically unbiased and the trigger wheel can be of a magnetic material or configured as a multi-polar ring.

Advantageously the housing has a pot-shaped housing base and a housing cover with an opening for the actuating shaft. The drive unit can be housed in the housing base and the brake unit in the housing cover.

BRIEF DESCRIPTION OF THE DRAWING

Additional advantageous aspects and details of the invention can be found in the description to follow, in which the invention is described in greater detail and explained on the basis of the aspects shown in the drawing.

In the drawing.

DETAILED DESCRIPTION

Figure 1:
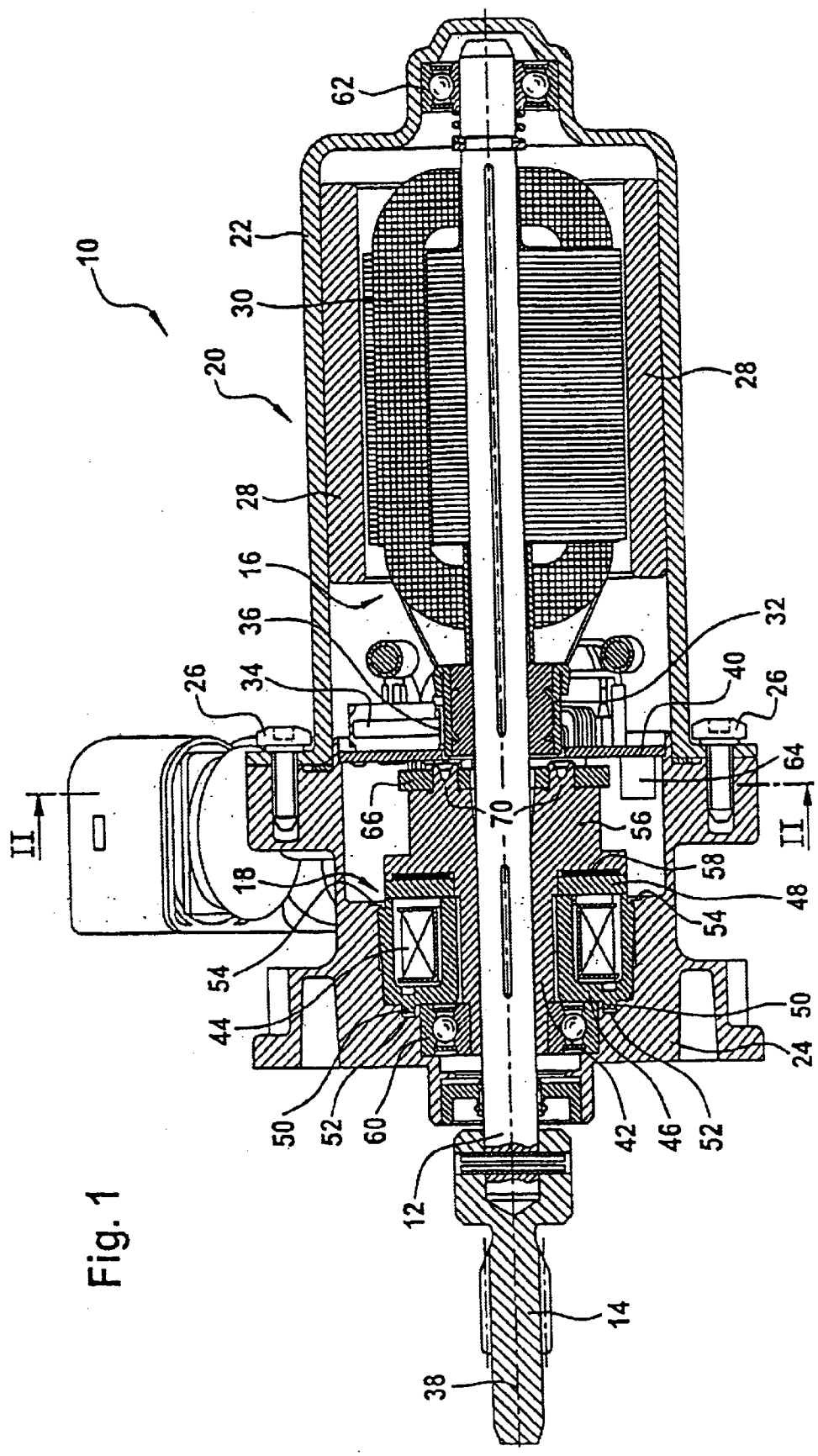
FIG. 1 is a longitudinal section through a first actuating device according to the invention.

A first aspect of an actuating device 10 of the invention is shown in FIG. 1. The actuating device 10 has a pinion 14 on the free end of an actuating shaft 12, by means of which a locking differential, which is not shown, on a vehicle can be actuated. The actuating device comprises a drive unit 16 and an electromagnetic brake unit 18, where the drive unit 16 and the brake unit 18 are accommodated in a common housing 20. The housing 20 comprises a pot-shaped housing base 22, which positions the drive unit 16. The housing further comprises a housing cover 24, in which the brake unit 18 is located. The housing cover 24 can be tightly bolted to the housing base 20 by means of fasteners 26.

The drive unit 16 includes permanent magnets 28 on the housing side which interact with an armature core 30 attached to the actuating shaft 12 so as not to rotate. The drive unit 16 further comprises a commutator 32, attached to the actuating shaft so as not to rotate, against whose outer surface brushes 36 carried in brush holders 34 act. The holders 34 are attached to a brush rocker 40 positioned perpendicularly to the longitudinal axis 38 of the actuating shaft 12.

The brake unit 18 comprises a brake hub flange 42 mounted solidly on the actuating shaft 12 and a brake body 46 secured against the housing cover 24 so as not to rotate and including a brake winding 44. In addition, the brake unit 18 includes a brake rotor 48, configured as a brake rotor ring, which is secured against rotation, but with limited axial movement. When current is applied to the brake winding 44, the brake rotor 48 acts against the similarly ring-shaped brake body 46. Consequently, when current is applied to the brake winding 44, the braking effect results, and the actuating shaft 12 is prevented from rotating against the housing 20, or against the housing cover 24, through the brake hub flange 42, the brake rotor 48 and the brake body 46. To ensure that the brake body 46 is located securely against rotation in the housing cover 24, the brake body 46 furnishes pins 50 extending coaxially to the longitudinal axis 48, which extend into correspondingly formed blind holes 52 in the housing cover. To securely fasten the brake body 46 within the housing cover 24, there are clinching sections 54 on the housing cover 24 which are clinched to corresponding sections on the outer surface of the brake body 46.

To ensure a specified position for the brake rotor 48 when the brake unit 18 is not activated, a spring element 58 is provided between the brake rotor 48 and a section of the brake rotor carrier 56 of the brake hub flange 42, which pushes the brake rotor 48 against the section of the brake rotor carrier 56.

Two bearing elements 60 and 62 are provided to carry the actuating shaft 12.

Figure 2:
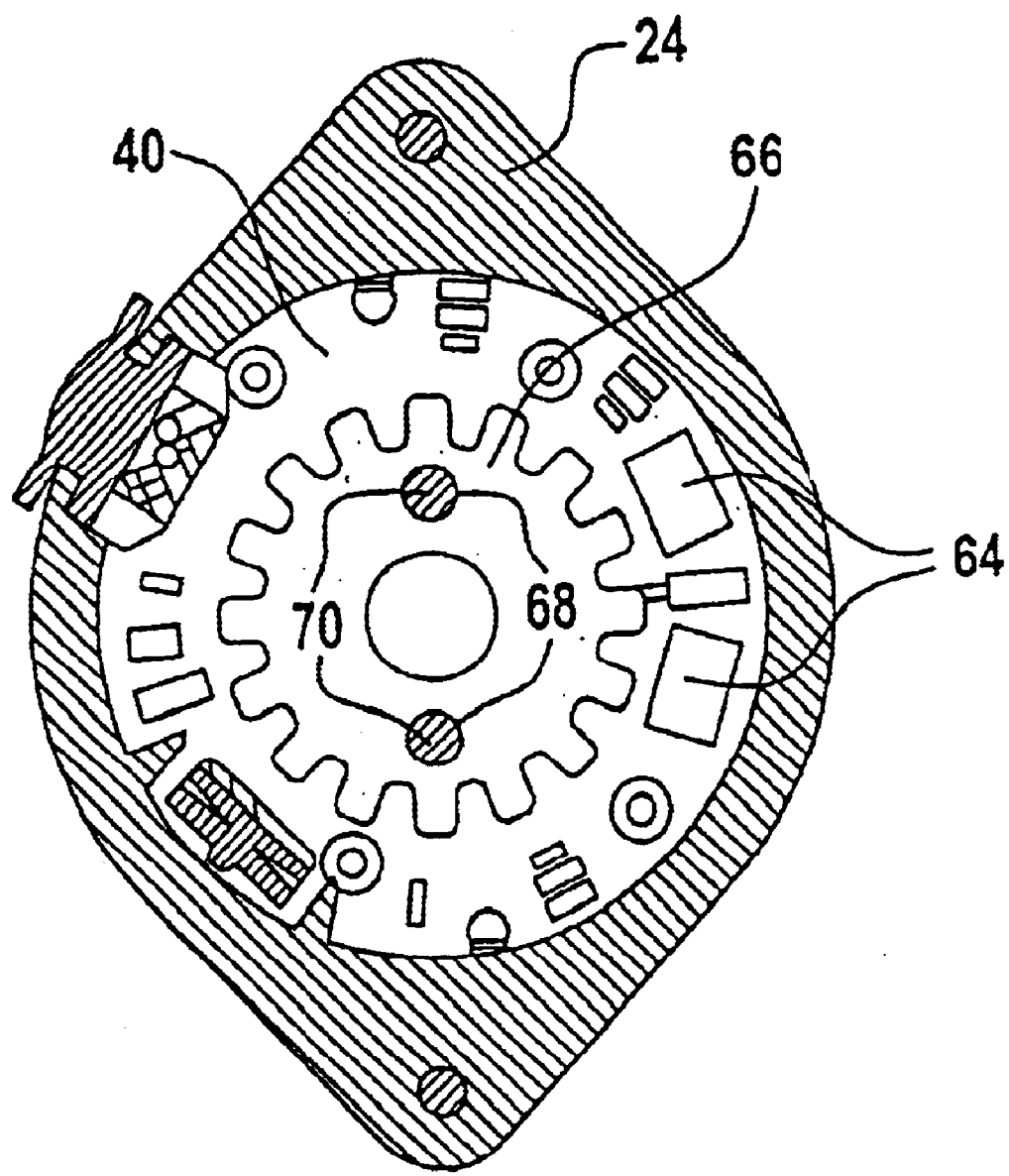
FIG. 2 is a cross section through an actuating device from FIG. 1 along line II.

As can be seen from FIGS. 1 and 2, sensors in the form of Hall generators 64 are located on the side of the brush rocker 40 facing the brake flange 42 or the section of the brake rotor carrier 56. To determine the angle of rotation of the actuating shaft 12, a trigger wheel 66 is located on the side of the brake hub flange 42, or of the brush rocker carrier 56, facing the brush rocker 40. By means of two holes 68, the trigger wheel 66 is attached to mounting pins 70 on the brake hub flange 42. The trigger wheel is preferably of a ferrous material or configured as a multi-polar ring.

Positioning the trigger wheel 66 on the brake hub flange 42 has the advantage that no additional components are needed to attach the trigger wheel.

Figure 3:
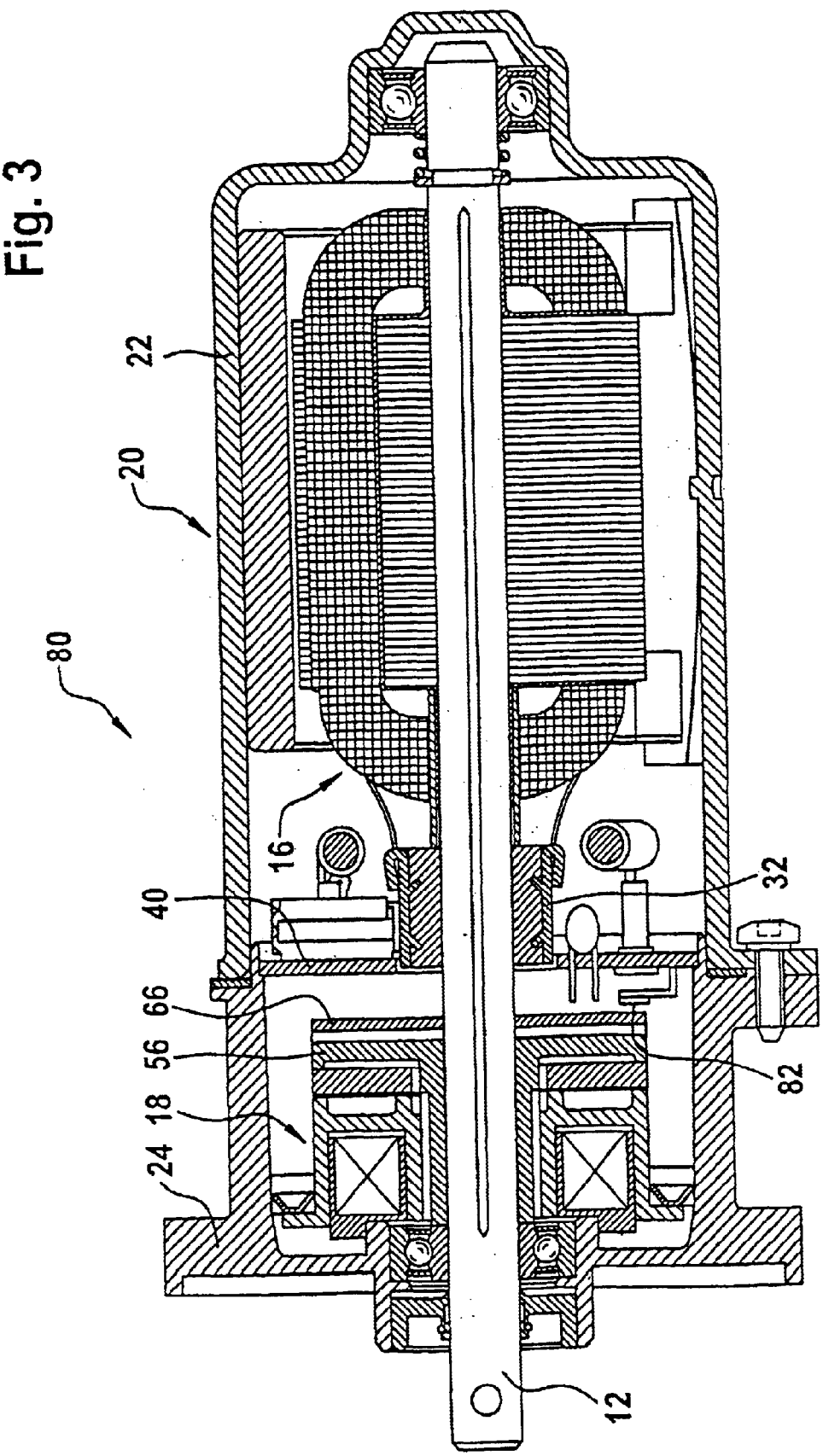
FIG. 3 is a longitudinal section through a second actuating device of the invention.
Figure 4:
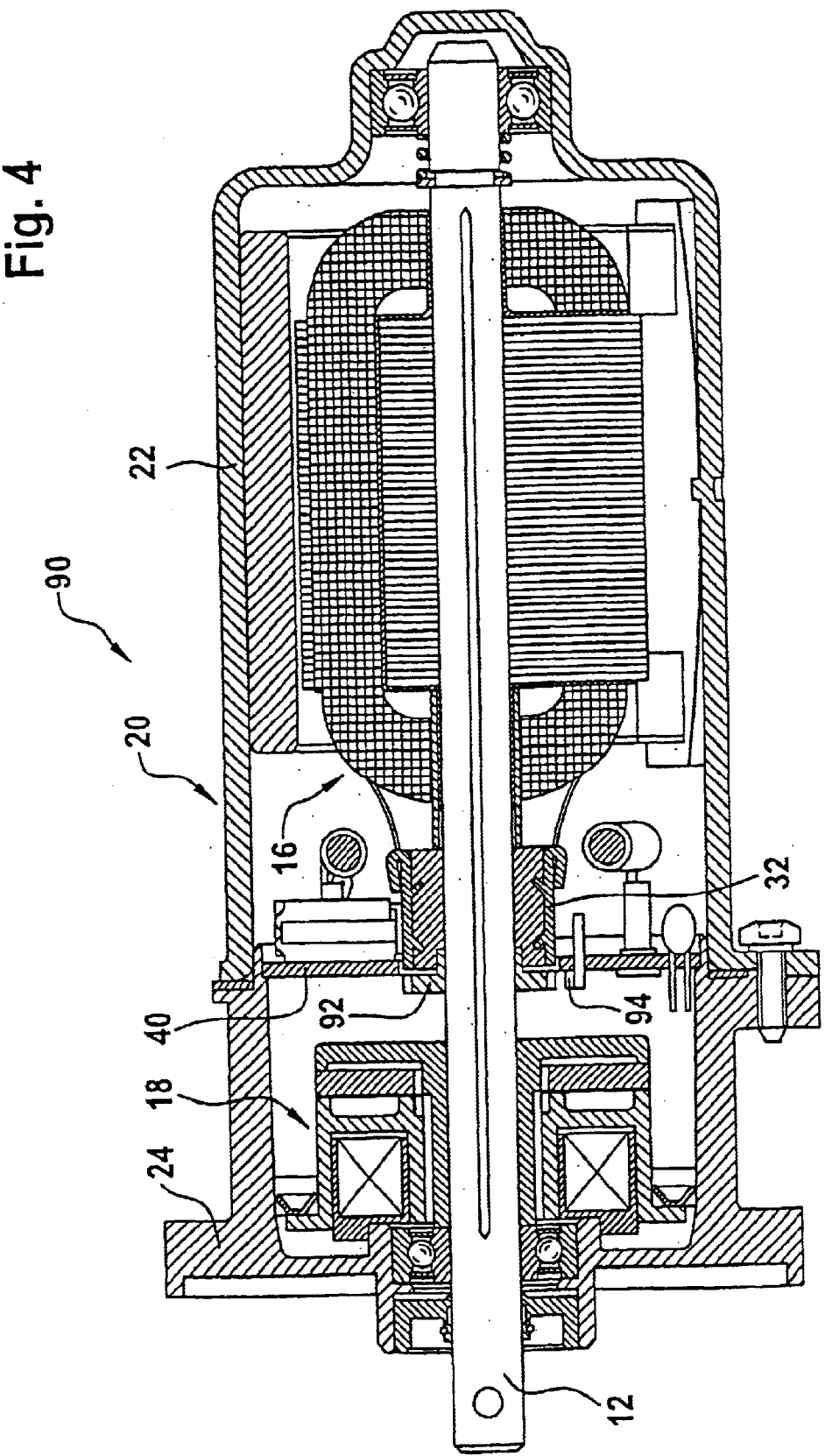
FIG. 4 is a longitudinal section through a third actuating device of the invention.
Figure 5:
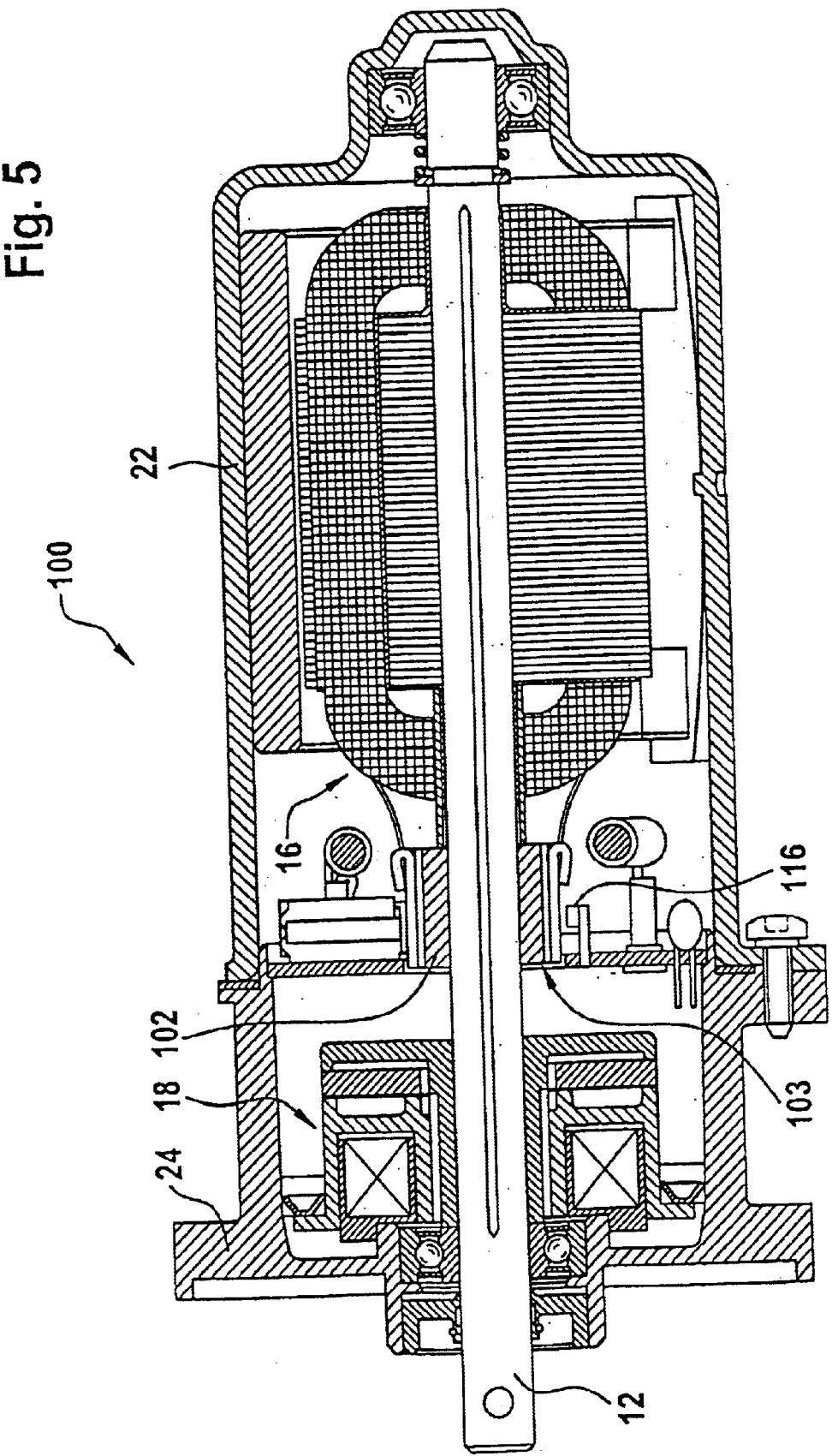
FIG. 5 is a longitudinal section through a fourth actuating device of the invention.

Other actuating devices under the invention 80, 90 and 100 are shown in FIGS. 3, 4 and 5. Components identical to the actuating device 10 are identified with the same reference numbers in the actuating devices 80, 90 and 100.

Actuating device 80 differs from actuating device 10 and the others in that the trigger wheel 66 is not scanned radially, but rather axially in order to establish the angle of rotation of the actuating shaft 12. At least one suitably located Hall generator 82 is furnished in order to do this.

Actuating device 90 shown in FIG. 4 has a trigger wheel 92 which is mounted on the face of the commutator 32 facing the brush rocker 40, or the brake unit 18. The trigger wheel 92 is preferably embedded along sections into the commutator material, specifically into molded plastic material, and passes through the brush rocker 40. The trigger wheel 92 and the commutator 32 form a component which can be handled as one.

The actuating device 90 has a sensor 94 in the form of a Hall generator. The Hall generator 94 is located in such a way that it scans the trigger wheel 92 radially. The Hall generator 94 is located on the brush rocker 40.

Figure 6:
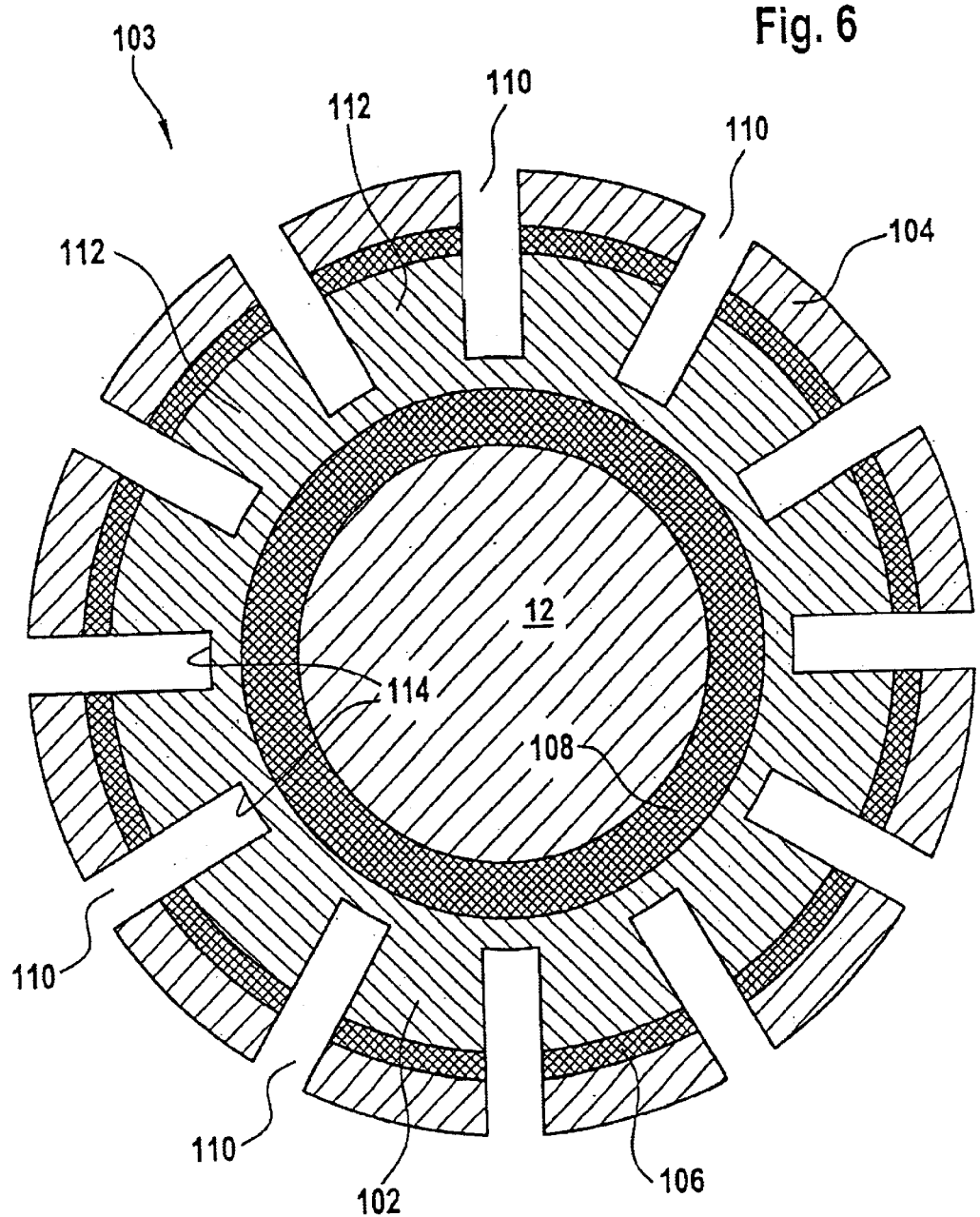
FIG. 6 is a cross section through the commutator of the actuating device from FIG. 5.

The actuating device 100 shown in FIG. 5 has a trigger wheel 102 which is completely integrated into the commutator 103. FIG. 6 shows a cross-section through the commutator 103. It can be clearly seen that the commutator 103 has an external contact layer 104. The contact layer 104 is of a conductive material, specifically of copper. In the assembled state, the free ends of the brushes 36 bear against the contact layer 104. The trigger wheel 102 is formed by an internal core of the commutator 103. Between the core and the contact layer 104 there is an intermediate layer 106 of specifically insulating material, such as molded plastic. Advantageously there is an internal layer 108 against the inside of the commutator 103 lying against the actuating shaft 12, which similarly consists advantageously of molded plastic material.

As is clear from FIG. 6, the commutator 103 has slots 110 directed radially inward, which subdivide the contact layer 104 into bars or annular segments. The slots 110 also subdivide the trigger wheel 102 into tooth-like trigger wheel segments 112, where the bases 114 of the slots 110 lie in the core of the commutator 103 forming the trigger wheel 102.

To produce a commutator 103 shown in FIG. 6, the individual commutator layers can be manufactured as nesting cylindrical rings. The slots 110 can, for example, be produced by cutting or milling.

The current position or the current angle of rotation of the trigger wheel 102 or of the commutator 103 is scanned by sensors 116 located on the brush carrier plate 40, specifically by Hall generators. Scanning takes place in a radial direction, in accordance with FIG. 5.

It is also conceivable to scan the contact layer 104 or the bars or annular segments directly, instead of scanning the trigger wheel. They would then have to be of a suitable material. With an embodiment of this type, no additional trigger wheel has to be made.

All the features depicted in the description, the claims to follow and the drawing can be fundamental to the invention individually and in any combination.

What is claimed is:

1. An actuating device, to actuate locking differentials on vehicles comprising:
   an actuating shaft;
   a drive unit to drive the actuating shaft, where the drive unit includes an armature core non-rotatably mounted on the actuating shaft and a commutator non-rotatably mounted on the actuating shaft;
   a housing tightly enclosing one of the drive unit and a brake unit, where a free end of the actuating shaft protrudes from the housing; and
   a sensor unit to measure the angle of rotation of the actuating shaft, where the sensor unit includes at least one trigger wheel indirectly coupled to the actuating shaft and mounted on a brake hub flange and at least one sensor indirectly coupled to the housing which scans the trigger wheel position.

2. The actuating device from claim 1, wherein the trigger wheel is configured as one piece with a brake hub flange.

3. The actuating device from claim 1 wherein the trigger wheel is mounted on one of the side of a brake hub flange facing away from the free end of the actuating shaft and on the side of the brake hub flange facing the commutator.

4. The actuating device from claim 1, wherein the trigger wheel is mounted on the commutator.

5. The actuating device from claim 4, wherein the trigger wheel is mounted on the face of the commutator facing away from the armature core.

6. The actuating device from claim 1, wherein on the side of the commutator facing one of the free end of the actuating shaft and between a brake hub flange and the commutator, a brush rocker is located with brush holders and brushes to make contact with the commutator.

7. The actuating device from claim 6, wherein the sensor is mounted on a brush carrier plate.

8. The actuating device from claim 1, wherein the sensor scans the trigger wheel radially.

9. The actuating device from claim 1, wherein the sensor scans the trigger wheel axially.

10. The actuating device from claim 1, wherein the trigger wheel is configured as a toothed wheel.

11. The actuating device from claim 1, wherein the sensor unit is a Hall generator.

12. The actuating device from claim 11, wherein the sensor is magnetically biased and the trigger wheel is of a ferrous material.

13. The actuating device from claim 12, wherein the sensor is non-magnetically biased and the trigger wheel is one of magnetic material and configured as a multi-polar ring.

14. The actuating device from claim 1, wherein the housing has a pot-shaped housing base and a housing cover with an opening for the actuating shaft.

15. The actuating device from claim 14, wherein the drive unit is located in the area of the housing base and the brake unit is located in the area of the housing cover.

16. An actuating device, to actuate locking differentials on vehicles comprising:
    an actuating shaft;
    a drive unit to drive the actuating shaft, where the drive unit includes an armature core non-rotatably mounted on the actuating shaft and a commutator non-rotatably mounted on the actuating shaft;
    a housing tightly enclosing one of the drive unit and a brake unit, where a free end of the actuating shaft protrudes from the housing; and
    a sensor unit to measure the angle of rotation of the actuating shaft, where the sensor unit includes at least one trigger wheel indirectly coupled to the actuating shaft and at least one sensor indirectly coupled to the housing which scans the trigger wheel position, the trigger wheel is mounted on and integrated at least in sections into the commutator.

17. The actuating device from claim 16, wherein the commutator has an external contact layer and an inner core forming the trigger wheel.

18. The actuating device from claim 17, wherein an intermediate layer is furnished between the contact layer and the core forming the trigger wheel.

19. The actuating device from claim 18, wherein the commutator has slots directed radially inward, which subdivide the contact layer into annular segments.

20. The actuating device from claim 19, wherein the slots subdivide the trigger wheel into trigger wheel segments, where the bases of the slots are in the core forming the trigger wheel.

21. The actuating device from claim 16, wherein the annular segments of the commutator form the trigger wheel.

* * * * *